Aug. 11, 1970  J. P. SPIRES  3,523,342
SEAT BELT BUCKLE LATCH
Filed Nov. 29, 1968  3 Sheets-Sheet 1
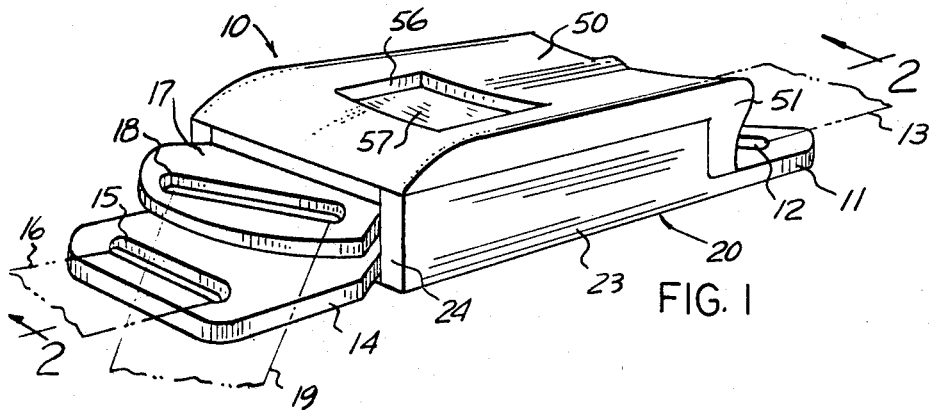
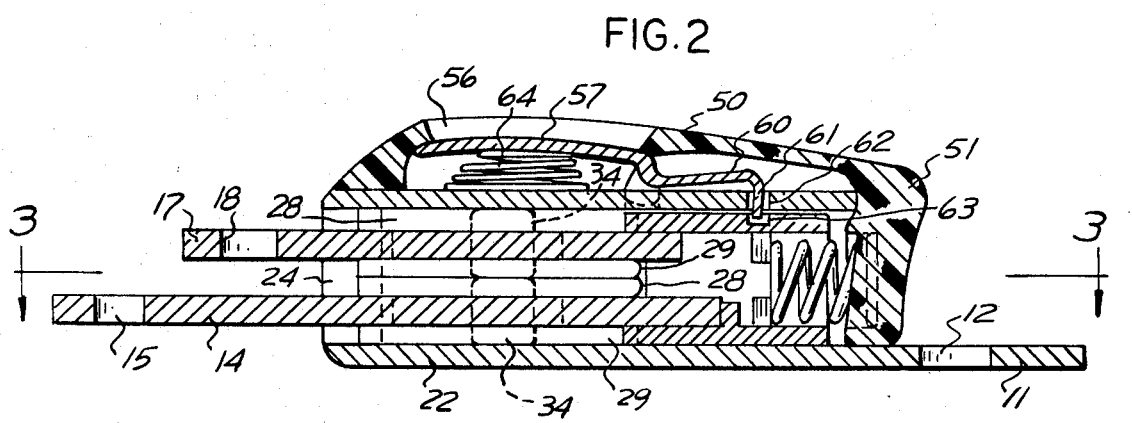
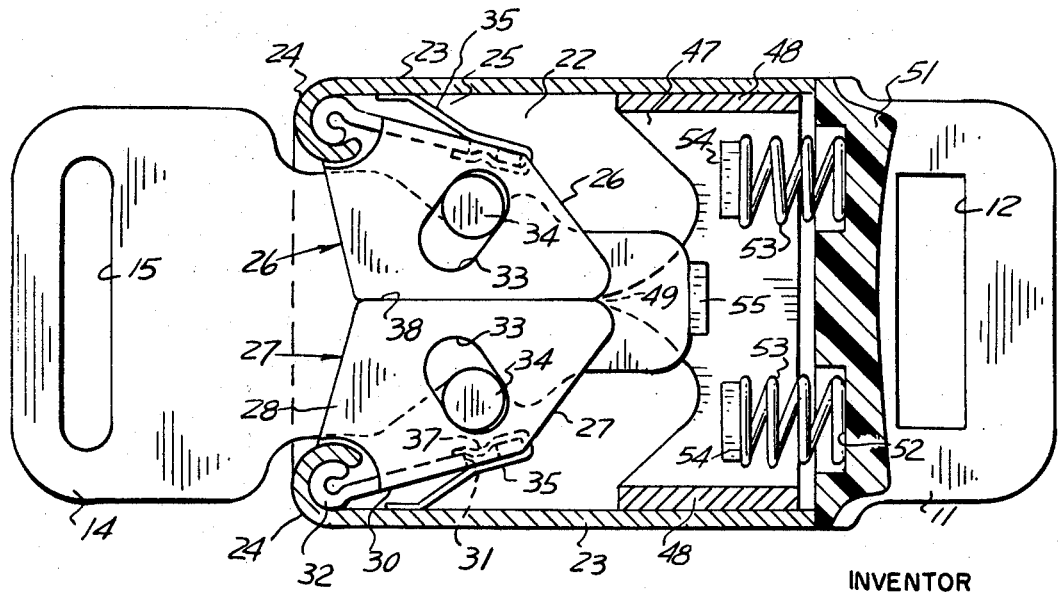
INVENTOR
JOHN P. SPIRES
BY Cullen, Sloman, & Cantor
ATTORNEYS

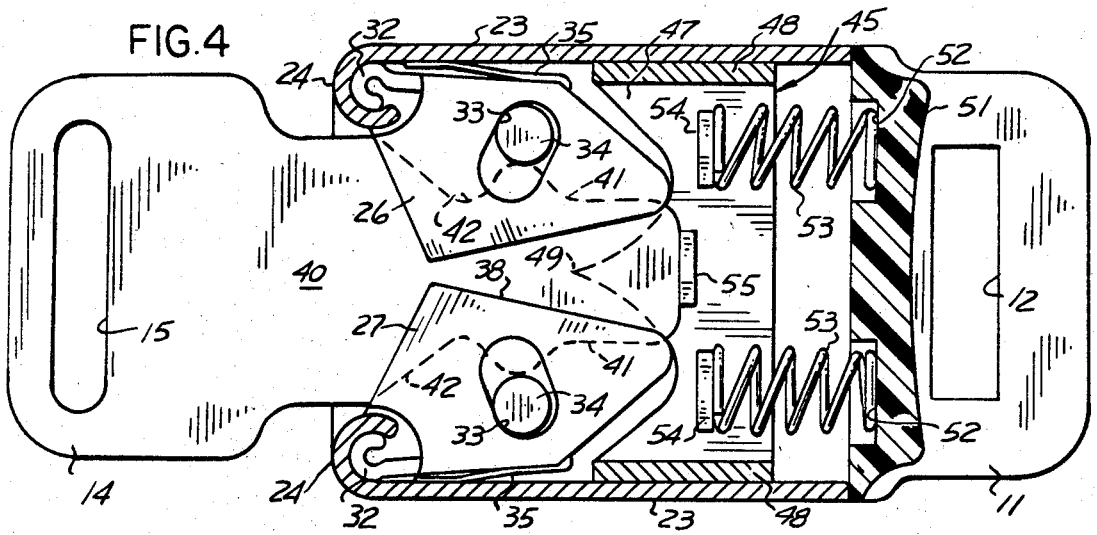
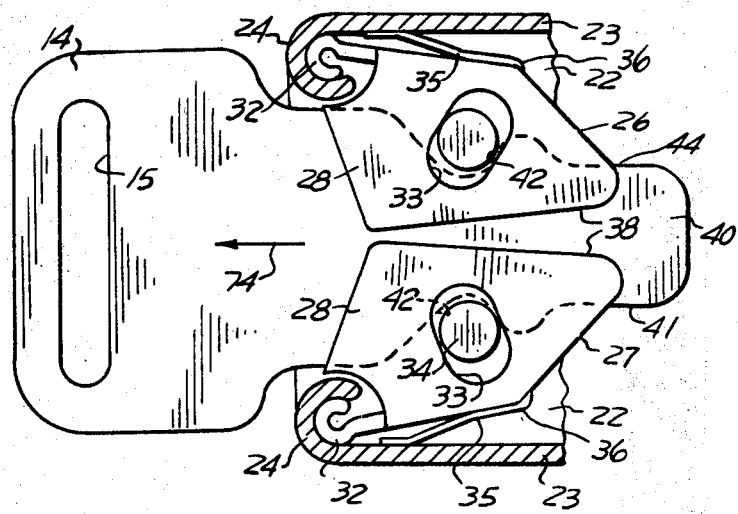
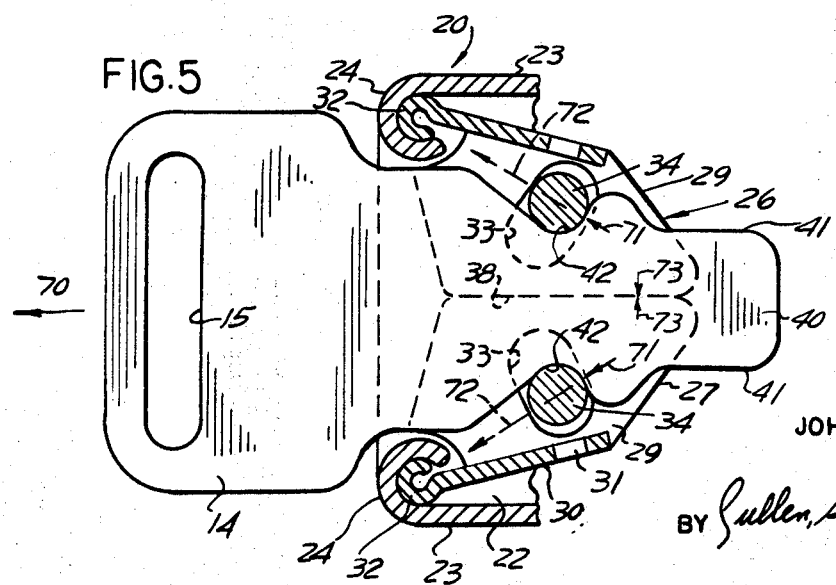

Aug. 11, 1970   J. P. SPIRES   3,523,342
SEAT BELT BUCKLE LATCH
Filed Nov. 29, 1968   3 Sheets-Sheet 3

INVENTORS
JOHN P. SPIRES

BY Cullen, Sloman, & Cantor

ATTORNEYS

United States Patent Office 3,523,342
Patented Aug. 11, 1970

3,523,342
SEAT BELT BUCKLE LATCH
John P. Spires, 1215 Turrill Road,
Lapeer, Mich. 48446
Continuation-in-part of application Ser. No. 699,463,
Jan. 22, 1968. This application Nov. 29, 1968, Ser.
No. 779,870
Int. Cl. A44b 11/00
U.S. Cl. 24—230                8 Claims

ABSTRACT OF THE DISCLOSURE

A buckle latching mechanism formed of a pair of opposing arms having spaced apart ends pivotally connected to the buckle housing and opposite ends converging towards and in contact with each other during latching to form a rigid triangle, with rollers carried by the adjacent ends, and with a belt tongue slidably positioned between the pivots along the axis of the triangle and having socketed edges for rollingly receiving the rollers for thereby latching the tongue to the housing. A slidable wedge separates the arms for rollingly disengaging the rollers from the sockets to unlatch the tongue.

---

This application is a continuation-in-part of Ser. No. 699,463 filed Jan. 22, 1968, now abandoned.

BACKGROUND OF THE INVENTION

Seat belt buckle latching mechanisms, of the type used in automotive vehicle and aircraft safety belts, must be designed to carry substantial applied loads without disengaging or unlatching. Thus, they are normally bulky and formed of heavy, thick materials to carry the required loads.

It is desirable to be able to deliberately unlatch or release such latching mechanisms, even when under heavy load, with minimal applied forces, such as finger pressure upon a button. However, the size, shape, and heavy frictional forces of conventional latching mechanisms make it extremely difficult to deliberately release the mechanism when under applied load.

Thus, the invention herein is concerned with a latching mechanism which may be formed of relatively lightweight, thin material, to reduce bulkiness and will readily sustain high applied loads, while at the same time due to low friction construction, may be easily released by low releasing pressures even when under heavy load.

SUMMARY OF INVENTION

In summary, the invention herein contemplates a latching mechanism formed of a pair of latching arms, each having an end pivotally connected to the buckle housing, with their opposite ends converging and normally in contact during latching. Each arm carries a roller near its opposite end for rollingly engaging the opposite edges of a latching tongue and for rollingly entering sockets or depressions formed on the opposite edges of the tongue.

Thus, during latching, the arms form, with the housing, a rigid triangle for transmitting and resisting heavy applied loads. However, the roller engagement with the tongue edges permits low friction sliding movement of the tongue into and out of the housing and, by means of separating the arms, low friction, rolling movement of the rollers out of the respective sockets for release of the tongue.

Thus, an object of this invention is to provide a latching mechanism formed of pivotally movable arms which, during latching, form a rigid generally triangular shaped load supporting structure, but which engages the surfaces to be latched with a low friction, rolling contact for low pressure release, when desired.

Thus, the geometry of the parts causes the rollers to act as part of the load bearing structure and the size and shape of the buckle parts may be considerably reduced to reduce the bulk and weight of conventional buckles.

In addition, another object of this invention is to form the buckle to receive and latch two tongues, as for example, a seat or lap belt tongue and a shoulder harness belt tongue, merely by duplicating and stacking several of the internal latching parts, such as the foregoing arms and rollers.

These and other objects and advantages of this invention will become apparent upon reading the following description, of which the attached drawings form a part.

DESCRIPTION OF DRAWINGS

FIG. 1 is a perspective view of the buckle and belt tongues in latching position.

FIG. 2 is a cross-sectional elevational view taken as if in the direction of arrows 2—2 of FIG. 1.

FIG. 3 is a cross-sectional plan view taken in the direction of arrows 3—3 of FIG. 2.

FIG. 4 is a view similar to FIG. 3, but showing the belt tongue entering the buckle but not yet latched.

FIG. 5 is a fragmentary view, similar to FIG. 4, showing the belt tongue in latched position with loads applied thereto.

FIG. 6 is a fragmentary view, similar to FIG. 5, showing the disengagement or unlatching of the tongue.

DETAILED DESCRIPTION

Figure 7:
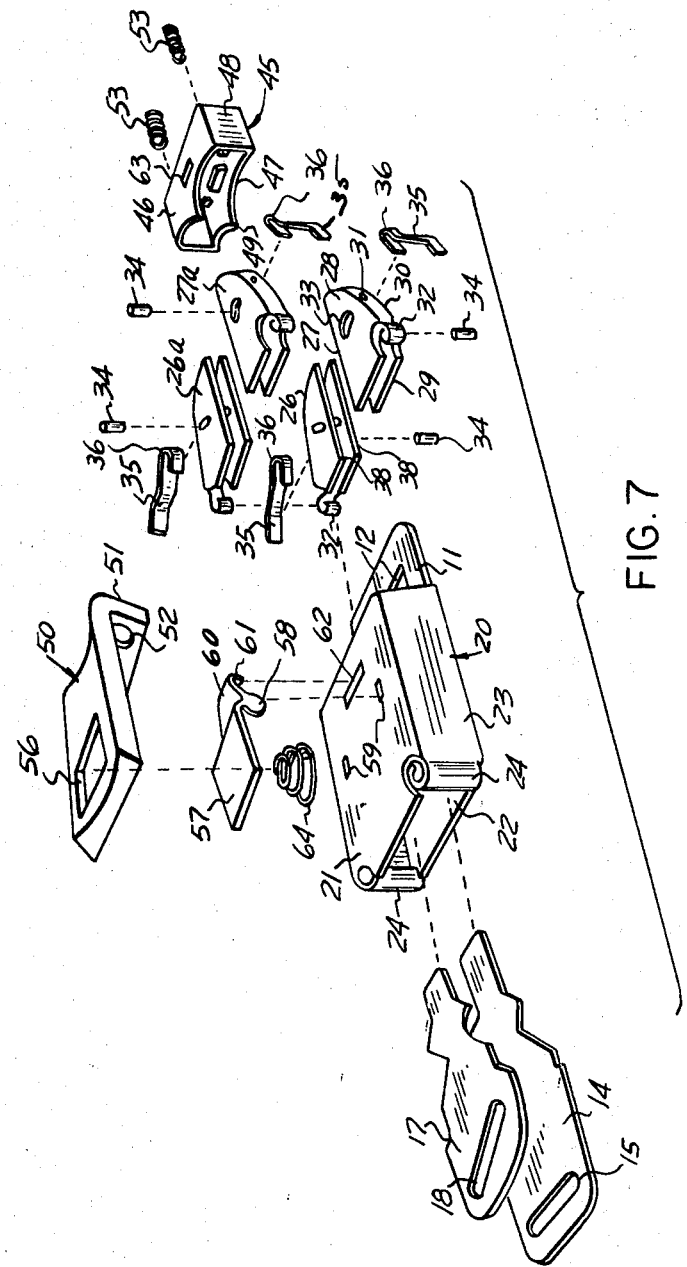
FIG. 7 is an exploded perspective view of the parts making up the buckle herein.

FIG. 1 illustrates a buckle 10 having an end extension 11 formed with a slot 12 to which a conventional seat belt end 13 may be secured in the conventional manner.

Latched to the buckle is a lap belt tongue 14 having a slot 15 to which is secured the end 16 of a lap belt. Also secured to the buckle is a shoulder strap tongue 17 having a slot 18 to which the end 19 of a shoulder strap is secured. The foregoing straps correspond to the conventional seat belt and shoulder harness belt used in automotive vehicles where each belt has an end anchored to the vehicle and an opposite end either anchored to the buckle or to one of the tongues for thereby restraining the passenger of the vehicle. The buckle mechanism herein may be utilized either for securing together the ends of a lap belt or both a lap belt and a shoulder harness belt.

Referring to FIGS. 2, 3 and 7, the buckle is formed of a housing 20 having an upper wall 21, a lower wall 22 with which the extension 11 is integral, and side walls 23 to form a box-like construction. The forward ends of the side walls are curled or bent to form pivot sockets 24. The housing itself provides a pocket 25 to receive the latching mechanism and the belt tongues.

Within the pocket are a lower pair of latching arms 26 and 27 and an upper pair of latching arms 26a and 27a. The two pair of arms are identical and are used where the buckle is to latch a pair of tongues. The upper pair of latching arms may be omitted where the buckle is to be used to latch only one tongue. For simpler explanation, only one pair of the latching arms will be described in more detail below.

As seen in FIGS. 3 and 7, the arms each are formed of an upper plate 28, spaced above a lower plate 29 and joined together by a side plate 30 having a spring detent hole 31 formed therein. One end of the side plate is curled or bent into a pivot 32 which fits within and is pivotally supported by the pivot curl 24 of the buckle housing. The upper and lower plates are suitably relieved in the area of the pivot bend or curl to permit pivoting of the arms.

Each plate is provided with an arcuate slot 33 preferably formed on a curve whose center point is the center of the pivot 32. The slots receive the opposite ends of a roller 34 which thus spans the space between the upper and lower arm plate and may roll within the slot and relative to the arm.

Each arm is provided with a leaf spring 35 having a bent end 36 for embracing its side plate 30, with the bent end of the spring being indented at 37 to fit within the side hole 31 for securing the spring to the arm. The springs 35 normally resiliently bias the pair of arms toward each other so that their ends opposite to the pivot ends, are normally in face to face contact. These opposite ends 38 are preferably formed in long straight edges for long, edge to edge or surface to surface contact. Thus, the arms normally form a V or triangular shaped arrangement relative to the buckle housing. with their edges 38 meeting along the center line of the buckle housing.

The belt tongues slidably enter between the upper and lower plates of each arm and between the pivots of the arms relative to the housing. Each tongue is provided with a leading end 40 and with opposite latching edges 41, each having a depression or socket 42 formed therein and arcurately curved to correspond to the circumferential curvature of the rollers.

Thus, referring to FIG. 4, when the tongue is slidably moved into the buckle, between the opposite plates of the pair of arms, its leading end 40 contacts the opposite rollers 34 which rollingly move, with a low friction contact, along the opposite ends of the tongue and finally into the sockets 42, at which time the arms, which have beens spread apart by the tongue movement against the spring force of the leaf springs 35, now pivot towards each other again into edge to edge contact as shown in FIG. 3.

A wedge 45 is provided to separate the arms 26 and 27 for releasing the tongues therefrom. As shown in FIG. 7, the wedge is formed of an upper wedge plate 46, a lower wedge plate 47, the plates being joined by side walls 48 and with the plates having leading wedge tips 49 for entering between and wedging apart the pairs of arms 26–27 and 26a–27a.

The buckle housing is provided with a cover 50 which may be formed of molded plastic and secured to the upper plate of the housing by conventional mechanical means such as screws or rivets of the like. The cover has a rear cover wall 51 provided with a pair of spring sockets 52 (see FIGS. 2 and 3) which receive the ends of compression springs 53 whose opposite ends are bottomed or rested against stops 54 formed on the lower wedge plate 47. Thus the wedge 45 normally is spring urged towards the arms for separating them.

In addition, a tongue stop 55 may be formed on the lower wedge plate 47 for engaging the leading end 40 of the tongue 14 for normally tending to push the tongue outwardly of the buckle and for using the tongue movement to push the wedge rearwardly against the force of the springs 53.

To normally hold the wedge 45 away from the arms and to release the wedge for separating the arms when desired, the cover 50 is provided with a central aperture 56 beneath which is located a bell crank release 57 having integral lugs 58 which pivotally fit into lug slots 59 in the upper wall 21 of the buckle housing 20. The crank includes a release hook portion 60 having a tip 61 which passes through a tip slot 62 formed in the housing upper wall and enters into a tip slot 63 formed in the wedge upper plate 46. A coil spring 64 arranged between the bell crank 57 and the housing upper wall normally holds the bell crank upwardly so that its tip 61 engages the slot 63 in the wedge and maintains the wedge in its rearwardly or non-active position.

The application of manual pressure upon the bell crank 57 compressing its spring 64 causes the crank to pivot about its lugs so that its tip 61 disengages from the slot 63 in the wedge, releasing the wedge so that its springs 53 shift the wedge towards the arms for thereby permitting the tips 49 of the wedge to separate the pairs of arms.

OPERATION

In operation, starting with FIG. 4, the tongue 14 is slidably moved into the buckle housing and between the upper and lower plates of the arms 26 and 27. Rollers 34 roll along the edges 41 of the tongue until ultimately they roll into the socket 42. At the same time, the wedge 45 may be reset or moved rearwardly by the tongue pressure against the tongue stop 55.

FIG. 3 shows the tongue 14 now latched within the buckle.

As shown in FIG. 5, when a lateral load is applied to the belt, that is, a load indicated by the arrow 70 in FIG. 5 which tends to pull the tongue out of the buckle, the load is distributed, as shown by arrows 71 through the rollers 34 and then (see dotted arrows 72) through the arms and to the pivots 32 for transmission to the buckle housing. At the same time, part of the load, illustrated by arrows 73 is transmitted from one arm to the other so that the arms even more tightly and more rigidly engage each other for thereby forming a rigid triangular or V-shaped configuration which includes the rollers which are, in effect, gripped between the edges of the tongue sockets and the edges of the slots 33.

Despite heavy applied loads, should the arms be deliberately separated, as by deliberately pressing the crank 57 for releasing the wedge to thereby separate the arms, the rollers 34 will rollingly disengage from the tongue sockets 42, rolling upon the edges defining the slots 33 for thereby releasing or unlatching the tongue with relatively low friction and with low applied releasing force. FIG. 6 shows the releasing action and the rollers 34 rolling out of the respective sockets 42. There, the arrow 74 indicates the direction of relative movement of the tongue.

Although the foregoing describes a specific form of wedge releasing mechanism, other suitable forms of release mechanisms may be used which provide the same function of deliberately separating the arms when desired to thereby roll the rollers out of the tongue sockets for unlatching.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. A buckle latching mechanism comprising:
   a buckle housing having a buckle tongue receiving pocket;
   a pair of arms arranged within the pocket each having an end pivotally connected to the housing, with the pivots being spaced apart and the opposite ends of the arms converging towards each other and contacting each other edge to edge during latching;
   a roller carried by each of said opposite arm ends for rolling in axes parallel to the axes of arm pivoting;
   a tongue arranged to slidably fit within the pocket between the arm pivot and rollers, the tongue having opposite edges each formed with a roller receiving socket, wherein the rollers roll into the sockets when the tongue is slide into the pocket for latching the tongue therein;

and means for separating the arms for rolling the rollers out of the sockets for unlatching the tongue; whereby the arms form a rigid V-shape arrangement relative to the housing during latching, with the tongue arranged along the axis of and substantially in the plane of the arms.

2. A construction as defined in claim 1, and said arms each having arcuately curved slots formed therein adjacent the opposite ends for rollingly receiving and carrying the rollers and arranged for rolling movement of the rollers relative to the arms within their respective slots in arcuate paths relative to the pivots.

3. A construction as defined in claim 1, and said means for separating the arms including a wedge arranged to engage the opposite ends of the arms at their meeting edges, and means for moving the wedge along the meeting edges for forcing them apart.

4. A construction as defined in claim 1, and wherein each arm is formed of a pair of spaced apart parallel plates for slidably receiving the tongue between the plates;

said plates being slotted adjacent the opposite ends of the arms for receiving the ends of the rollers so that the rollers span the space between the pairs of plates for thereby engaging said opposite edges of the tongue.

5. A construction as defined in claim 4, and including spring means engaging each arm for normally biasing the arms towards each other for edge to edge engagement of the respective pairs of plates of each arm at the ends of the arms;

and with the roller receiving slots formed in the arms being curved on an arc approximately centered upon the arm pivot for rolling movement of the rollers relative to the arms and the tongue during disengagement of the rollers from the tongue.

6. A buckle latching mechanism comprising:

an arm having an end pivotally mounted upon a support and having a roller engaged with its opposite end for rolling in an axis parallel to the axis of pivoting;

a surface to be latched having a socket formed therein for rollingly receiving said roller;

guide means for slidably guiding said surface adjacent said arm for rolling engagement therewith of said roller and for rollingly receiving said roller within said socket for latching said surface against disengagement due to laterally directed loads applied to the surface and support and wherein upon latching, said loads are transmitted through the roller and arm to the arm pivot and thereby to the support;

means for normally biasing said arm towards said surface and manually operable means for pivoting said arm away from said surface for rolling disengagement of the roller from said socket.

7. A construction as defined in claim 6, and said surface being formed as the edge of a tongue, with the tongue having a second opposing surface to be latched;

a second arm pivotally connected to the support for securing the tongue between the two pivots, and the second arm having a roller engaged with its opposite end opposing the first mentioned roller for rolling engagement with the second surface and for being rollingly received within a socket formed with the second surface for thereby simultaneously latching both surfaces to the support;

with the arms converging towards each other from their pivots during latching.

8. A construction as defined in claim 7 and the opposite ends of the arms being arranged in face to face engagement during latching to thereby form a rigid, generally V-shaped formation for equally transmitting loads from the tongue through the rollers and arms to the support.

References Cited

UNITED STATES PATENTS

| | | |
|---|---|---|
| 2,847,748 | 8/1958 | Robinton. |
| 2,856,665 | 10/1958 | Gimalouski. |
| 3,262,169 | 7/1966 | Jantzen. |

DONALD A. GRIFFIN, Primary Examiner

U.S. Cl. X.R.

297—389